GREAT CIRCLE AND CELESTIAL DATA COMPUTER

Filed Feb. 27, 1956 3 Sheets-Sheet 1

INVENTORS
SAMUEL D. BEDROSIAN
FRANK P. SIMMONS

BY Charles F. Carroll, Jr.
ATTORNEY

GREAT CIRCLE AND CELESTIAL DATA COMPUTER

Filed Feb. 27, 1956 3 Sheets-Sheet 2

INVENTORS
SAMUEL D. BEDROSIAN
FRANK P. SIMMONS
BY
Charles F. Carroll, Jr.
ATTORNEY May 10, 1960 S. D. BEDROSIAN ET AL 2,936,120

GREAT CIRCLE AND CELESTIAL DATA COMPUTER

Filed Feb. 27, 1956 3 Sheets-Sheet 3

INVENTORS
SAMUEL D. BEDROSIAN
FRANK P. SIMMONS

BY Charles F. Carroll, Jr.
ATTORNEY

United States Patent Office 2,936,120 Patented May 10, 1960

2,936,120

GREAT CIRCLE AND CELESTIAL DATA COMPUTER

Samuel D. Bedrosian, Havertown, and Frank P. Simmons, Devon, Pa., assignors to Burroughs Corporation, Detroit, Mich., a corporation of Michigan Application February 27, 1956, Serial No. 567,951

7 Claims. (Cl. 235—188)

This invention relates to analog computers and more specifically to mechanical and electrical analog computers for automatic manipulation of the inputs to a D'Ocagne nomogram for obtaining great-circle distances, bearings, solar zenith angles, and latitude and longitude of specific points.

The D'Ocagne nomogram is widely used for navigational and other great-circle calculations for the earth's surface. A particular adaptation and instructions for its use are shown and described in the 3rd edition of "Reference Data for Engineers" by Federal Telephone and Radio Corporation, pp. 423–426 and Fig. 24. Inspection if this nomograph and the complicated manual procedure accompanying it immediately reveals that such manual/graphical use of D'Ocagne's nomogram is complex, time-consuming, and subject to errors in manipulation, interpretation and resolution accuracy. This invention accepts inputs which are analogous to the inputs to a D'Ocagne nomogram and performs the manipulations pertinent to the calculations which are involved. It is an automatic process which avoids these complexities, errors, and inaccuracies.

An object of this invention is to provide an analog computer, automatically to perform great-circle calculations to obtain great-circle distance, initial bearing angle, final bearing angle, mid-latitude, and mid-longitude.

Another object of this invention is to provide an analog computer, automatically to perform celestial computations to obtain altitude and true azimuth of a point in space.

Another object of this invention is to provide a mechanical analog computer comprising a plurality of interlinked cosine-generating yokes to perform great-circle calculations for navigational purposes.

Another object of this invention is to provide an electrical analog computer comprising a plurality of cosine voltage generators, a plurality of multipliers to obtain product outputs from cosine generator voltages, and a difference-voltage balance detector, to perform navigational type great circle calculations.

A further object of this invention is to provide a computer to perform the analog of computations performed through manipulation of the D'Ocagne nomograph.

For a detailed description of this invention reference is made to the specifications and to the drawings, in which:

Fig. 1 is a spherical triangle of a particular great-circle navigation problem;

Fig. 2 graphically illustrates a relation between parts of the aforementioned great-circle navigation problem;

Figure 1:
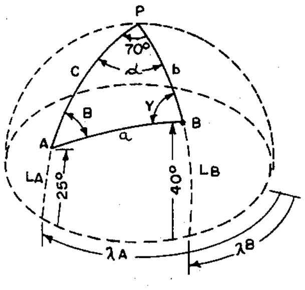

Referring now to Fig. 1, the general formulae for spherical triangles includes the following:

$$\cos a = \cos b \cos c + \sin b \sin c \cos \alpha \quad (1)$$

This equation can be found in the 3rd edition, "Reference Data for Radio Engineers," by Federal Telephone and Radio Corporation, page 587. Substituting the values of the triangle shown in Fig. 1 in this equation, we obtain:

$$\cos (\text{arc } AB) = \cos (90-L_B) \cos (90-L_A) + \sin (90-L_B) \sin (90-L_A) \cos (\lambda_A-\lambda_B) \quad (2)$$

since:

$b = 90° - L_B$ $c = 90° - L_A$ $d = \lambda_A - \lambda_B$ $a$ = great-circle arc AB This Equation 2 will later be compared with the results of a nomograph computaion to determine the accuracy and validity of the nomograph's computation.

Figure 2:
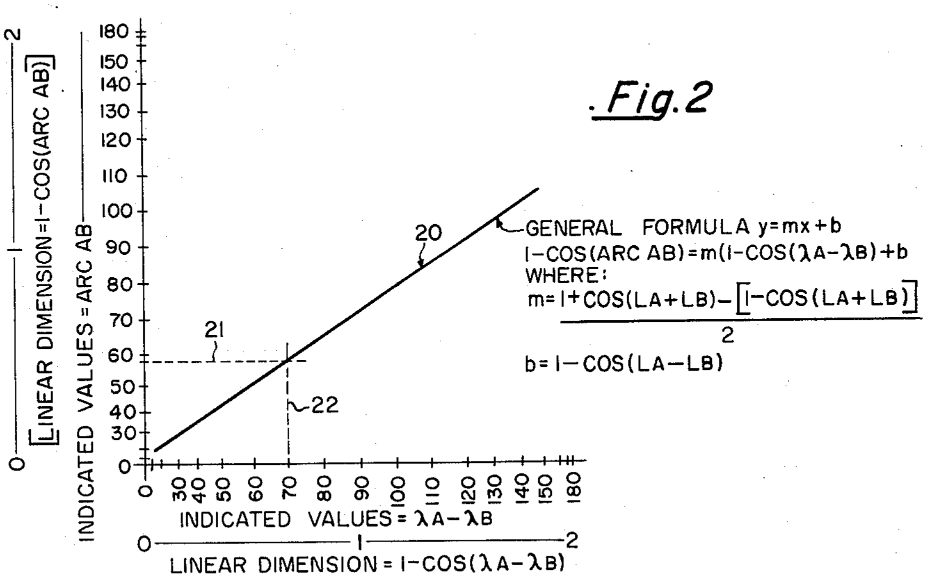
Figure 3:
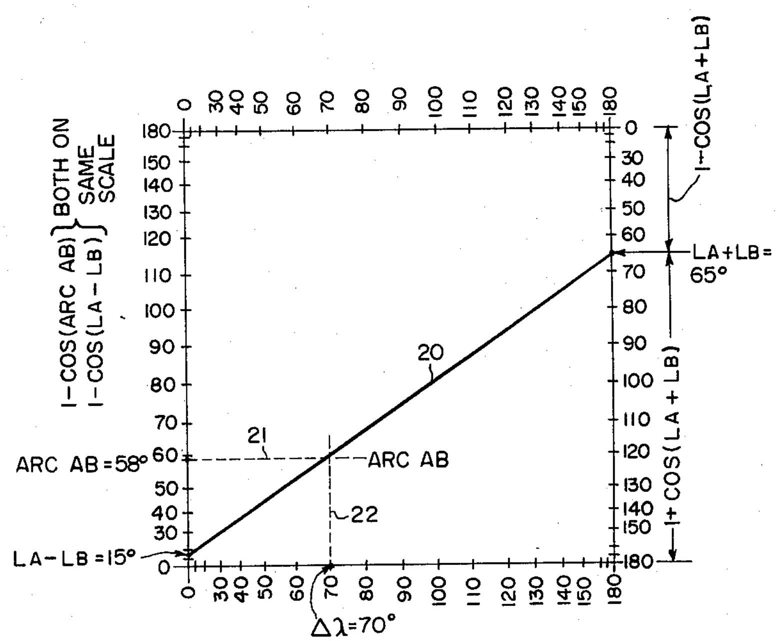
Fig. 3 is a D'Ocagne nomogram showing data obtained from the aforementioned spherical triangle.

The basis for a graphical solution to a great-circle navigational problem is shown in Figs. 2 and 3. The ordinate or $y$ axis is a plot of $1-\cos$ (arc $AB$), from 0 degrees where $1-\cos 0°$ is $1-1$ or zero, through 90 degrees where $1-\cos 90°$ is $1-0$ or 1, to 180 degrees where $1-\cos 180°$ is $1-(-1)$ or 2. In addition to the linear dimensions of $1-\cos$ (arc AB), the corresponding angular value of arc AB in degrees is shown. The abcissa or X axis is a plot of $1-\cos (\lambda_A-\lambda_B)$ where $\lambda_A$ and $\lambda_B$ are longitudes of A and B. Again, the angular range in degrees (0–180°) is shown along with the actual linear dimension of $1-\cos (\lambda_A-\lambda_B)$. The straight line 20 is mathematically expressable in the slope-intercept form, $y=MX+b$ where M is slope or ratio of $y/x$ for a fixed portion of the line, and $b$ is the intercept of the line on the $y$ axis. Since the ordinate is equal to $1-\cos$ (arc $AB$) and the abcissa is equal to $1-\cos (\lambda_A-\lambda_B)$, this equation becomes:

$$1-\cos (\text{arc } AB) = m[1-\cos (\lambda_A-\lambda_B)]+b \quad (3)$$

where $m$ is defined as $$\frac{1+\cos (L_A+L_B)-[1-\cos (L_A-L_B)]}{2}$$

(where the X portion of the line is 2 units long)

$b$ is defined as $1-\cos (L_A-L_B)$,

And $L_A$=latitude of A, and $L_B$=latitude of B. The basis for defining $m$ in terms of $L_A$ and $L_B$ will be explained in connection with Fig. 3.

Substituting the defined values of $m$ and $b$ in Equation 3

$$1-\cos(\text{arc } AB)=\left[\frac{1+\cos(L_A+L_B)-[1-\cos(L_A-L_B)]}{(4)}\right]\cdot[1-\cos(\lambda_A-\lambda_B)]+1-\cos(L_A-L_B) \quad (4)$$

solving Equation 4 for cos (arc $AB$);

$$1-\cos(\text{arc } AB)=\frac{[\cos(L_A+L_B)+\cos(L_A-L_B)][(1-\cos(\lambda_A-\lambda_B)]-2\cos(L_A-L_B)+2}{2}$$

$$1-\cos(\text{arc } AB)=\frac{\cos(L_A+L_B)-\cos(L_A-L_B)-\cos(\lambda_A-\lambda_B)[\cos(L_A+L_B)+\cos(L_A-L_B)]+2}{2} \quad (5)$$

using the trigonometric identity expressed in the 3rd edition of "Reference Data for Engineers" by Federal Telegraph and Radio Corporation, page 584, line 10:

$$\cos(A\pm B)=\cos A\cos B\mp\sin A\sin B$$

Equation 5 becomes $$1-\cos(\text{arc } AB)=\frac{\begin{array}{l}\cos L_A\cos L_B-\sin L_A\sin L_B\\ -(\cos L_A\cos L_B+\sin L_A\sin L_B)\\ -\cos(\lambda_A-\lambda_B)[\cos L_A\cos L_B-\sin L_A\sin L_B]\\ -\cos(\lambda_A-\lambda_B)[\cos L_A\cos L_B+\sin L_A\sin L_B]+2\end{array}}{2}$$

which reduces to $$1-\cos(\text{arc } AB)=-\sin L_A\sin L_B-\cos(\lambda_A-\lambda_B)[\cos L_A\cos L_B]+1$$

or $$\cos(\text{arc } AB)=\sin L_A\sin L_B+\cos(\lambda_A-\lambda_B)\cos L_A\cos L_B \quad (6)$$

From the known relationship of sine and cosine as expressed on page 586, line 6, of the 3rd edition of "Reference Data for Engineers,"

$$\sin A=\cos(90°-A)$$

substitutions are made in Equation 6 to give:

$$\cos(\text{arc } AB)=\cos(90-L_A)\cos(90-L_B)+\cos(\lambda_A-\lambda_B)\sin(90-L_A)\sin(90-L_B)$$

or as rearranged:

$$\cos(\text{arc } AB)=\cos(90-L_B)\cos(90-L_A)+\sin(90-L_B)\sin(90-L_A)\cos(\lambda_A-\lambda_B) \quad (7)$$

which Equation 7 is identical with Equation 2. From this identity, when slope $m$ is determined by $L_A$ and $L_B$ as will be explained in connection with Fig. 3 which elaborates upon Fig. 2, it can be concluded that the graph of Fig. 2 is an exact solution of the great-circle navigation problem, and that the intersection of horizontal line 21 with the ordinate axis as set by the interception of vertical line 22 with function line 20, accurately determines the arc AB. Automation of this approach will provide navigating computers of high inherent accuracy.

As shown in Fig. 3 the slope $m$ and $y$-axis intercept $b$, which are utilized in Fig. 2, can be obtained graphically on the same set of coordinates as used in Fig. 2. An extra function $1-\cos(L_A-L_B)$ is plotted along the same ordinate or $y$ axis as is the ordinate $1-\cos(\text{arc } AB)$. The abcissa remains $1-\cos(\lambda_A-\lambda_B)$ but at abcissa value 2 where $\cos(\lambda_A-\lambda_B)=\cos 180°$, another ordinate is plotted, which ordinate is the function $1+\cos(L_A+L_B)$. Since $1+\cos(L_A+L_B)$ has a value of L for $$L_A+L_B=180°,$$

1 for $L_A+L_B=90°$ and 2 for $L_A+L_B=0°$, the corresponding plot of angle $L_A+L_B$ in degrees begins at 180° and goes upward to 0° at linear value of 2 on the graph. All values of $1+\cos(L_A+L_B)$ for other values of $L_A+L_B$ either greater than 180° or less than 0° will fall within this 0–2 range, so it is not limited nor does it distort the line which is determined.

To determine $m$ and $b$, take a hypothetical example where $L_A=25°$, $L_B=40°$, and $\lambda_A-\lambda_B=70°$. Determine the angle $L_A-L_B$ (25°−40°=−15°), and place a point on the $y$ axis at the value (15°). The negative value plots the same as a positive difference would plot. The angular values are plotted so that a linear distance of $1-\cos(L_A-L_B)$ is covered. In this case it is $1-\cos 15°$. This is the intercept $b$.

To determine the slope $m$, one more point is required, along the ordinate erected at value 2 of the abcissa. The value of $L_A+L_B$ is determined (25°+40°=65°) and $1+\cos(L_A+L_B)$ is plotted on this ordinate. The points thus plotted determine the slope and intercept point which fully define line 20 on the nomogram of Fig. 2 and Fig. 3. With line 20 determined, the difference in longitude can be plotted as line 22, intersecting line 20. This intercept determines line 21 which intercepts the $y$ axis at the linear value of $1-\cos(\text{arc } AB)$. The corresponding angular values of arc AB have been plotted so arc AB can be read off at once.

Valuable improvements in accuracy, utility, and convenience are obtained when the above described cosine and sine terms are generated and utilized in an analog computer to produce the answer to the problem.

Figure 4:
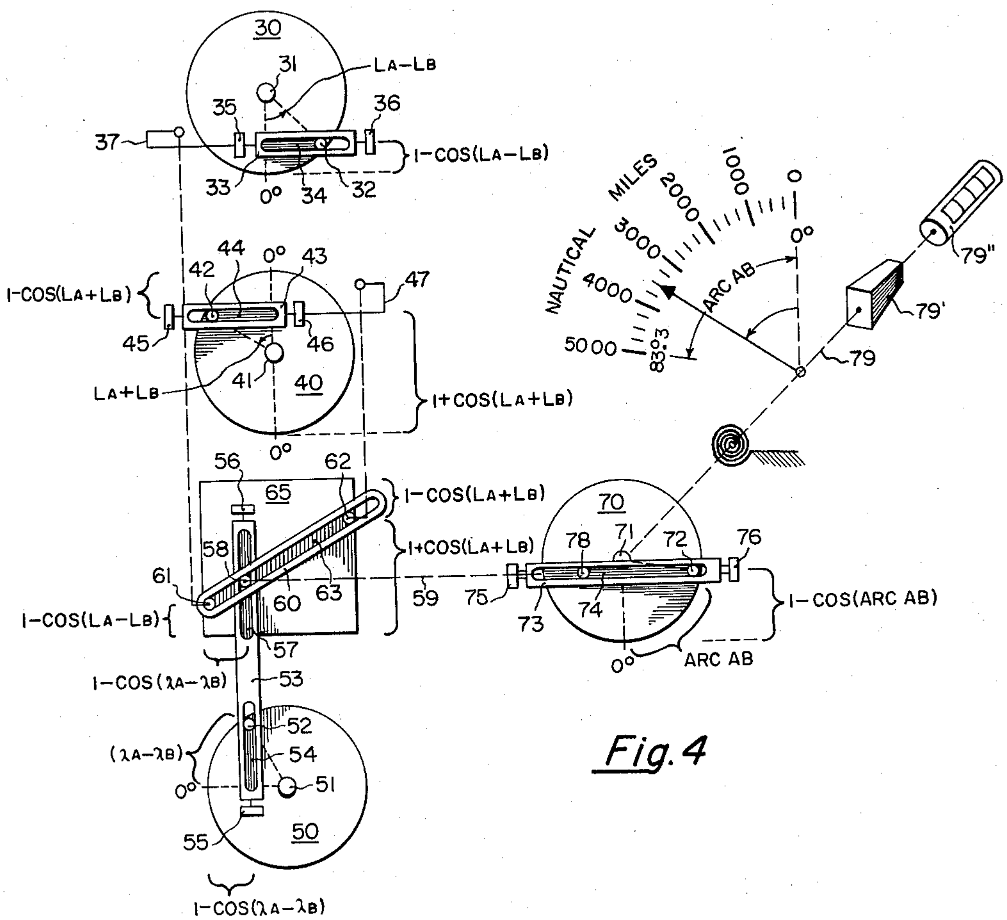
Fig. 4 is an exploded view of a mechanical computer to perform the analog computations for solution of great-circle problems.

Fig. 4 shows a mechanical embodiment of an analog computer to solve the great-circle navigational problem. Disc 30 turns on shaft 31 to generate an angle $L_A-L_B$. Pin 32 is fixed on the face of disc 30 and engages yoke 33 in slot 34. Yoke 33 is restrained from all movement except a straight-line translation parallel to the line through 0° and the disc's center of rotation 31. Motion in this direction in response to rotation of disc 30 causes yoke 33 to move a distance analogous to 1 minus the cosine of the angle of rotation, i.e., $1-\text{cosine}(L_A-L_B)$. Guides 35 and 36 may be slides on accurately aligned ways or guide rods, or any other suitable means for permitting only the above-described motion for yoke 33. Bracket 37 links yoke 33 to arm 60 at point 61, to transmit the motion of yoke 33 to point 61. As the disc rotates through angle $L_A-L_B$, pin 32 will move yoke 33 through a distance equal to $1-\cos(L_A-L_B)$, which motion is translated to point 61, so that the left end of arm 60 is moved upward a distance analogous to $1-\cos(L_A-L_B)$ from its zero position.

Disc 40 is mounted to rotate about center 41, to generate an angle $L_A+L_B$. Pin 42 is mounted on the face of disc 40 and engages yoke 43 in slot 44. Yoke 43 is restrained from all motion except translation along a line parallel to the line through 0° disc position and the center 41 of the disc's rotation. Guides 45 and 46 are slides or other accurately aligned ways or guide rods which permit yoke 43 to move only along a straight-line translation parallel to the line through 0° and center 41. Bracket 47 links yoke 43 to arm 60 through pin 62 which moves in slot 63 of arm 60. While the motion which yoke 43 actually generates from its position at 0° is $1-\cos(L_A+L_B)$, it will be evident from Fig. 4 that this motion is from the top of the plane 65. If this value $1-\cos(L_A+L_B)$ is subtracted from 2, the full height of plane 65, the remainder is $1+\cos(L_A+L_B)$ which is the height of pin 62 above the abcissa or lower horizontal axis of plane 65.

With bearing 61 and pin 62 positioned as described, arm 65 is sloped to a value analogous to the slope $m$ of the line 20 in Figs. 2 and 3.

Disc 50 is mounted to rotate about center 51, to generate an angle $(\lambda_A-\lambda_B)$ from a 0° reference which is 90° displaced from the 0° reference for discs 30 and 40. Pin 52 is mounted on the face of disc 50 and engages yoke 53 in slot 54. Yoke 53 is restrained from all movement except a straight-line translation parallel to a line through 0° reference of disc 50, and the center of rotation 51 thereof. This motion of yoke 53 is analogous to 1—cos $(\lambda_A-\lambda_B)$, when disc 50 is rotated an angle $(\lambda_A-\lambda_B)$. Guides 55 and 56 are slides, rollers, or other means permitting only the above described motion. Yoke 53 also has slot 57 in that extension of yoke 53 over plane 65. Pin 58 is engaged with slot 57 of yoke 53 and slot 63 of arm 60, permitting free translational motion of yoke 53 and both translation and rotation of arm 60 in a plane parallel to plane 65, yet riding along at their intersection point.

Motion of pin 58 is translated by linkage 59 to pin 78 which engages slot 74 of yoke 73. Yoke 73 is restrained from all movement except linear translation along a line parallel to the line through 0° reference for disc 70 and its center of rotation 71. Guides 75 and 76 are slides, rollers or other means permitting only the above described motion. Disc 70 has pin 72 mounted on the face of disc 70 and engaging slot 74 in yoke 73. As pin 78 drives yoke 73 up or down, in motion parallel to the line through center 71 and the 0° reference point, it moves pin 72 and causes disc 70 to rotate. The translational motion of yoke 73 is analogous to 1—cos (arc *AB*), or line 22, of Figs. 2 and 3. The rotational motion which it produces in disc 70 is analogous to arc AB in angular measure, degrees or radians. In this manner, disc 70 and yoke 73 provide an "inverse cosine" function translating a cosine input to an angular output. This corresponds to the interception of line 21 with the *y* axis in Fig. 2. A shaft connected to point 71 on disc 70 can be made to position a counter in nautical miles. Gear Train 79' is intermediately coupled between shaft 79 and counter 79'' so that for a 1/360 revolution of shaft 79, or for each one degree movement of disc 70 the output of gear train 79' is 6 revolutions, or one revolution per 10 mile increment (nautical). This output is coupled to counter 79'' which is read directly.

Arc AB in degrees is directly convertible to nautical miles between points A and B of Fig. 1, since, by definition, one nautical mile is equal to the arc on the earth's surface which subtends an angle of 1 minute at the earth's center, i.e., one nautical mile equals one minute of arc on the earth's surface. Statute miles are as easy a conversion as nautical, the conversion being:

$$\text{nautical miles}\times\frac{6080}{5280}=\text{statute miles}$$

Figure 8:
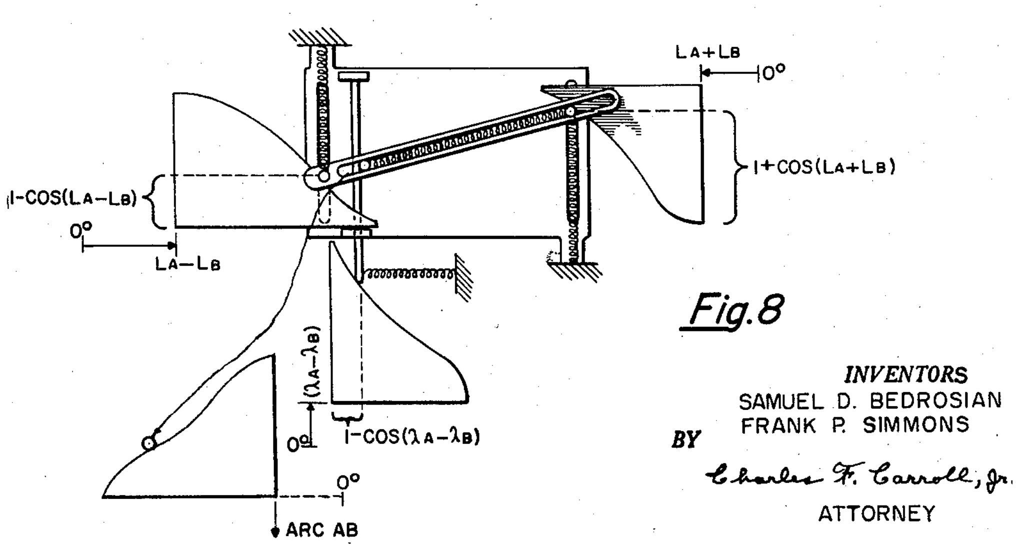
Fig. 8 illustrates another mechanical computer using cosine contoured cams.

While scotch-yoke type cosine generators have been shown, another embodiment of a cosine generator could be used as shown in Fig. 8. A cosine contoured sliding wedge, wherein the sliding motion is analogous to the angle being set into the computer and the wedge height is a function of the cosine of this analog of the angle, could be used. Pins ride the contours of such wedges to generate cosine motion, and are linked together and to a slope arm as before described. A fourth cosine contoured wedge is driven by this pin motion to function as an inverse cosine generator.

Figures 5, 6:
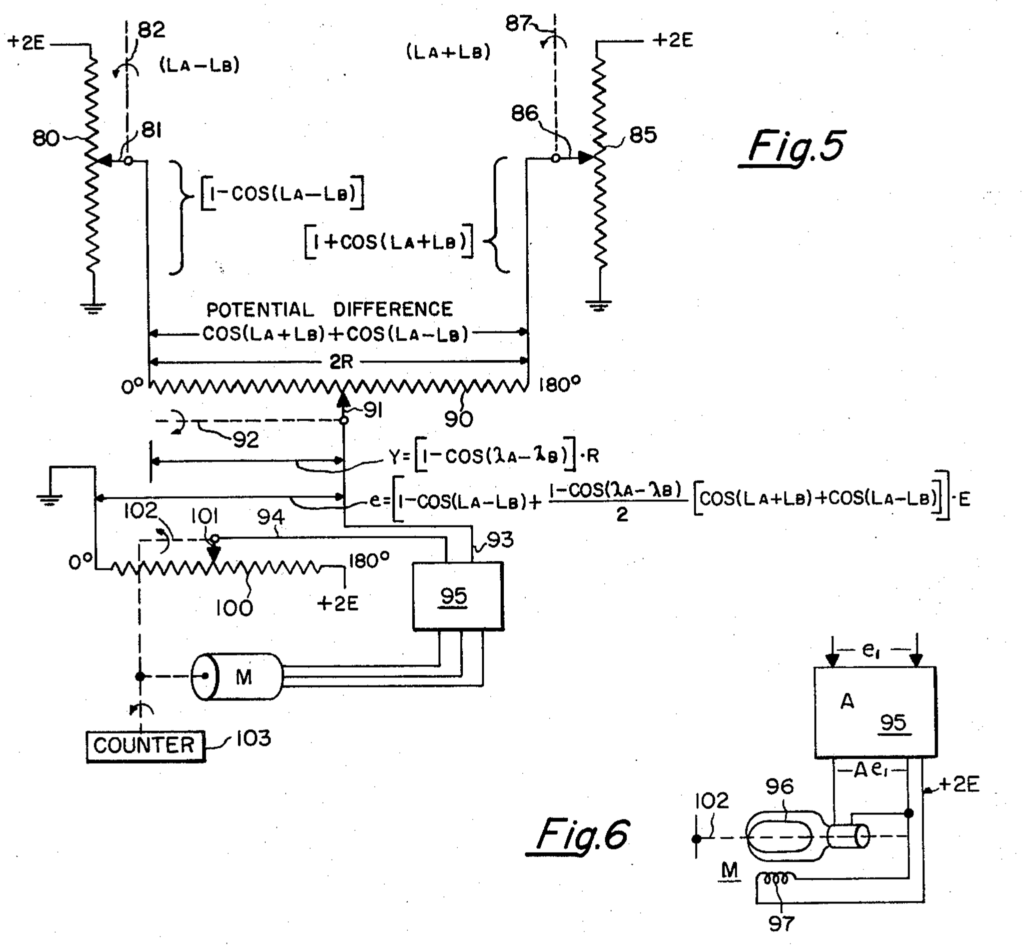
Fig. 5 is a schematic circuit diagram of an electrical computer to perform the computations for solution of great-circle problems.
Fig. 6 is a partial schematic showing a balancing system.

The great-circle computations described in connection with Figs. 2 and 3 also can be performed through electrical analogs of the trigonometric functions which are involved. In Fig. 5, nonlinear, symetrically tapered potentiometer 80 has movable contact 81 which is actuated by shaft 82. The resistance taper of potentiometer 80 is proportioned so that an angular movement of $(L_A-L_B)$ applied to shaft 82 moves contact 81 up from a zero degree or grounded position to where a voltage analogous to the function 1—cosine $(L_A-L_B)$ is on contact 81. Contact 81 is at the bottom of potentiometer 80 for 0° rotation and at the top for 180° rotation. Similarly, potentiometer 85 has movable contact 86 which is actuated by shaft 87. The resistance taper of potentiometer 85 is proportioned so an angular movement of $(L_A+L_B)$ applied to shaft 87 moves contact 86 to a position away from 0° reference position to where a voltage analogous to the function 1+cos $(L_A+L_B)$ is tapped by contact 86. Contact 86 is at the top of potentiometer 85 for 0° and at the bottom for 180° of rotation.

A third nonlinear potentiometer 90 is connected between contacts 81 and 86. Movable contact 91 on potentiometer 90 is actuated by rotation of shaft 92. The taper of resistance in potentiometer 90 is proportioned so that the resistance from the 0° end, at the left, to the position of contact 91 when shaft 92 has been rotated the angle $(\lambda_A-\lambda_B)$, is equal to 1—cosine $(\lambda_A-\lambda_B)$ times a resistance R, wherein the total potentiometer resistance is 2R. The factor of two stems from the fact that, at one extreme of travel for contact 91, when $(\lambda_A-\lambda_B)$ is 180°, the function 1—cosine $(\lambda_A-\lambda_B)$ becomes 1—cosine 180° or 2. The voltage which contact 91 picks from the potential across potentiometer 90 will be the ratio of the resistance between 0° end and contact 91 to the total resistance, times the potential across the potentiometer. This can be expressed as:

$$\frac{1-\text{cosine }(\lambda_A-\lambda_B)}{2}\times\text{potential across 90}$$

With potentiometer 90 connected between contacts 81 and 86, the potential across it will be the difference between the potentials on contacts 86 and 81. Since contact 81 has a potential analogous to 1—cos $(L_A-L_B)$ and contact 86 has a potential analogous to $$1+\cos(L_A+L_B)$$

the potential difference becomes $$\cos(L_A+L_B)+\cos(L_A-L_B)$$

The potential to ground from contact 91 on potentiometer 90 is the sum of the potential on contact 81 and the portion of the potential across potentiometer 90 which is tapped off by contact 91. This can be expressed as:

$$e=1-\cos(L_A-L_B)+\frac{1-\cos(\lambda_A-\lambda_B)}{2}[\cos(L_A+L_B)+\cos(L_A-L_B)]\cdot E \quad (8)$$

this voltage is analogous to the intercept of line 21 on the *y* axis in Fig. 2, i.e. it is analogous to 1—cos (arc *AB*). Any suitable indicator can be used to measure this voltage. A balancing or follow up device has been shown and described, although a voltmeter whose dial is calibrated to read (arc AB) for a voltage input 1—cos (arc *AB*) could be used.

This analogy can be expressed as:

$$1-\cos(\text{arc }AB)=1-\cos(L_A-L_B)+\frac{1-\cos(\lambda_A+\lambda_B)}{2}[\cos(L_A+L_B)+\cos(L_A-L_B)] \quad (9)$$

which is the same as Equation 4. This voltage which is analogous to 1—cos (arc *AB*) is then fed to amplifier 95 on lead 93, where it is to be measured in a balancing device which adjusts another potential to be equal to this voltage, and which measures the magnitude of the voltage in the process of adjustment to a balance.

The other potential applied through lead 94 to the input of amplier 95 comes from movable contact 101 on potentiometer 100. Potentiometer 100 has a resistance taper the same as potentiometer 80. Thus, rotation of shaft 102 through an angle (arc AB) moves contact 101 along the resistance to pick off a voltage analogous to 1—cosine (arc *AB*). When the shaft 102 has rotated through angle (arc AB), the potential on lead 94 equals the potential on lead 93, and the input to amplifier 95 goes to practically zero, since this input is the potential difference between leads 93 and 94.

When this equality does not exist, a potential difference is applied to amplifier 95 and drives motor M. Motor M's direction of rotation is determined by the polarity of this potential difference, and is arranged to rotate shaft 102 to move contact 101 in a direction which reduces the potential difference between leads 93 and 94. Shaft 102 also drives counter 103 which indicates the number of degrees of rotation of shaft 102. Amplifier 95 continues to drive motor M until contact 101 picks off a voltage substantially equal to the voltage on lead 93, at which point the input to amplifier 95 drops to less than its level for minimum response and the driving energy to motor M ceases. In performing this balancing action the balancing device has functioned as an "inverse cosine" generator. Counter 103 then indicates the value of arc AB in degrees or miles as desired.

The combination of amplifier 95 and motor M can be any one of several known systems. A satisfactory embodiment is as shown diagrammatically in Fig. 5. Amplifier 95 is a D.C. amplifier having a transfer constant A, such that an input $e_1$ shows up as an output $Ae_1$ having the same polarity as $e_1$ but of much greater amplitude. This output $Ae_1$ is fed to the armature 96 of reversible D.-C. motor M. Field winding 97 of motor M is fed with a voltage +E whose polarity does not change with changes in $e_1$. With these connections, the direction of rotation of motor M will change with a change in the polarity of $Ae_1$. Properly connected, this rotation will move contact 101 in a direction which reduces $e_1$. In moving contact 101, this rotation of shaft 102 also will cause indicator 103 to show the value of arc AB in degrees, miles, etc.

The analog computers of Figs. 4 and 5 can be used for performing the great-circle calculations for which the D'Ocagne nomograph is useful. The calculation for great-circle distance between points A and B has been shown and described. Three inputs $(L_A-L_B)$, $(L_A+L_B)$ and $(\lambda_A-\lambda_B)$ are entered into either the electrical or the mechanical computer, and (arc AB), the great-circle distance, is obtained as an output.

Bearing angle for the route from A to B with respect to the North Pole can be obtained by entering $$(\text{lat } A+\text{arc } AB-90°)$$

instead of $(L_A-L_B)$, on disc 30 or wiper arm shaft 82 and (lat $A$—arc $AB$+90°) instead of $(L_A+L_B)$ on disc 40 or wiper shaft 87. Move the input formerly used for $(\lambda_A-\lambda_B)$ on disc 50 or wiper arm shaft 92 until the counter 79'' or indicator 103 shows the angle (90°—lat $B$). The input formerly used for $(\lambda_A-\lambda_B)$ will then be positioned to show the bearing angle PAB. This use of the D'Ocagne nomograph is as described in the 3rd edition of "Reference Data for Radio Engineers," page 425.

Figure 7:
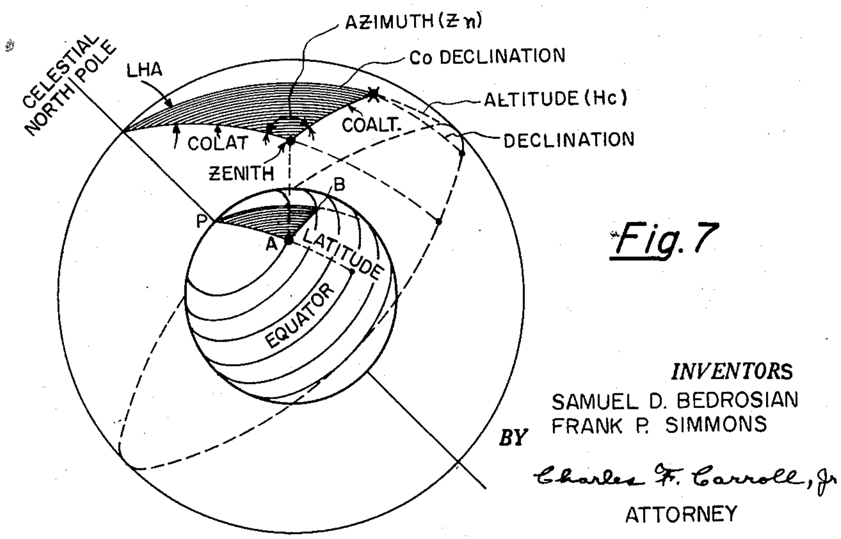
Fig. 7 illustrates a spherical triangle showing a particular celestial navigation problem.

The spherical triangle of Fig. 1 and the associated Equation 2 for this triangle are similar to the celestial triangle of Fig. 7 and an equation therefore which can be expressed as:

$$(\cos(\text{coalitude})=\cos(\text{colat}).\cos(\text{codecl})+\sin(\text{colat})\sin(\text{codecl})\cos LHA)$$

where $(90-H_c)$=coaltitude

By inspection of the similar triangles as shown in Fig. 7, the inputs to the computers of Figs. 4 and 5 can be stated:

Apply latitude minus declination as input to disc 30 or shaft 82;

Apply latitude plus declination as input to disc 40 or shaft 87;

Apply local hour angle as input to disc 50 or shaft 92;
Read coaltitude on counter 103 or counter 79'';
Substract coaltitude from 90° to get $H_c$.

The azimuth $Z_n$ can be determined in the same manner as solving for bearing angle PAB of Fig. 1, as follows:

Apply {latitude+coaltitude−90° or latitude−altitude} to disc 30 or shaft 82;

Apply {latitude−coaltitude+90° or latitude and altitude} to disc 40 or shaft 87;

Move disc 50 or shaft 92 until counter 79'' or indicator 103 shows the angle 90°—declination.

The input on disc 50 or shaft 92 then will be positioned to show the azimuth angle.

Fig. 8 shows another mechanical computer for providing the same mathematical service. Cosine contoured cams and spring-loaded pins replace the scotch yokes, but the analog motions are otherwise the same.

What is claimed is:

1. A computer for great-circle calculations comprising an arm movable only in one plane, first mounting means supporting said arm near one end thereof and movable in a straight line within said one plane, second mounting means supporting said arm near the other end thereof and movable parallel to said straight line and within said one plane, a first cosine generator connected to move said first mounting means, a second cosine generator connected to move said second mounting means, a third cosine generator having an extension which reaches said movable arm and which is driven in motion perpendicular to the line of motion of said first and second mounting means and parallel to said one plane, a fourth cosine generator, coupling means engaging said movable arm and said extension at their intersection and moving therewith to drive said fourth cosine generator, and an indicator driven by said fourth cosine generator to show the inverse cosine of the motion of said coupling means.

2. A computer for great-circle calculations comprising an arm movable only in one plane, first mounting means supporting said arm and movable only in one straight line in said one plane, second mounting means supporting said arm and movable only in a line parallel to said one straight line, a first cosine generator having a rotatable member and a translatable member driving said first mounting means, a second cosine generator having a rotatable member and a translatable member driving said second mounting means, a third cosine generator having a rotatable member and a translatable member extending to said arm and movable in a line parallel to said one plane and perpendicular to said one straight line, coupling means engaging said arm and said extending translatable member at the intersection thereof, a fourth cosine generator connected to said coupling means, and an indicator driven by said fourth cosine generator to show a function of the inverse cosine of the motion of said coupling means.

3. A great-circle navigational computer comprising a source of voltage, a first nonlinear potentiometer connected to said voltage source and including a first variable contact and having a resistance from one end to said contact which varies according to the function $$\frac{1-\cos X}{2}$$

with contact position X, a second nonlinear potentiometer connected to said voltage source and including a second variable contact and having a resistance from one end to said second contact which varies according to the function $$\frac{1+\cos Y}{2}$$

with contact position Y, a third nonlinear potentiometer connected between said first and second variable contacts and having a third variable contact and a resistance from one end to said third contact which varies according to the function $$\frac{1-\cos Z}{2}$$

with contact position Z, a fourth nonlinear potentiometer connected to said voltage source and including a fourth variable contact and having a resistance from one end to said fourth contact which varies according to the function $$\frac{1-\cos W}{2}$$

with contact position W, and a balance indicating means connected to said third and fourth variable contacts to indicate when the voltage on said fourth variable contact equals the voltage on said third variable contact.

4. A computer for great-circle calculations comprising an arm movable only in one plane, first mounting means supporting said arm near one end and movable in a straight line within said one plane, second mounting means supporting said arm near the other end thereof and movable parallel to said straight line and within said one plane, a first cosine generator including a cosine contoured cam connected to move said first mounting means, a second cosine generator including a cosine contoured cam connected to move said second mounting means, a third cosine generator including a cosine contoured cam and an extension which reaches said movable arm and which is driven in motion perpendicular to the line of motion of said first and second mounting means and parallel to said one plane, a fourth cosine generator including a cosine contoured cam, coupling means engaging said movable arm and said extension at their intersection and moving therewith to drive said fourth cosine generator, and an indicator driven by said fourth cosine generator to show the inverse cosine of the motion of said coupling means.

5. A great-circle navigational computer including, in combination, a first potentiometer connectible to a voltage source and including a first variable contact and having a resistance from one end to said contact which varies according to the function $$\frac{1-\cos X}{2}$$

with contact position X, a second potentiometer connectible to a voltage source and including a second variable contact and having a resistance from one end to said second contact which varies according to the function $$\frac{1+\cos Y}{2}$$

with contact position Y, a third potentiometer electrically connected between said first and second variable contacts and having a third variable contact and a resistance from one end to said third contact which varies according to the function $$\frac{1-\cos Z}{2}$$

with contact position Z, and means electrically connected to said third contact and operable to translate the voltage thereof into navigational indications.

6. A computing device including, in combination, a first potentiometer means connectible to a voltage source and including a first variable contact and having a resistance from one end to said contact which varies according to the function $$\frac{1-\cos X}{2}$$

with contact position X, a second potentiometer means connectible to a voltage source and including a second variable contact and having a resistance from one end to said second contact which varies according to the function $$\frac{1+\cos Y}{2}$$

with contact position Y, a third potentiometer means electrically connected between said first and second variable contacts and having a third variable contact and a resistance from one end to said third contact which varies according to the function $$\frac{1-\cos Z}{2}$$

with contact position Z, and means electrically connected to said third contact and operable to translate the voltage thereof into observable indications.

7. A computer comprising, in combination, an arm movable in one plane, first mounting means supporting said arm near one end thereof and movable in a straight line parallel to said one plane, second mounting means supporting said arm near the other end thereof and movable parallel to said straight line and parallel to said one plane, a first cosine generator connected to move said first mounting means, a second cosine generator connected to move said second mounting means, a third cosine generator having an extension which reaches said movable arm and which is driven in motion substantially perpendicular to the line of motion of said first and second mounting means and parallel to said one plane, a fourth cosine generator, coupling means engaging said movable arm and said extension at their intersection and moving therewith to drive said fourth cosine generator, and an indicator driven by said fourth cosine generator and operable to show the inverse cosine of the motion of said coupling means.

References Cited in the file of this patent

UNITED STATES PATENTS

| | | |
|---|---|---|
| 2,225,905 | Clement | Dec. 24, 1940 |
| 2,373,771 | Maxson | Apr. 17, 1945 |
| 2,418,238 | Smith | Apr. 1, 1947 |
| 2,520,904 | Boehm | Aug. 5, 1950 |

FOREIGN PATENTS

| | | |
|---|---|---|
| 361,708 | Germany | Oct. 18, 1922 |

OTHER REFERENCES

Product Engineering ("Mechanical Computing Mechanisms," parts II and IV), pp. 119–123 in September 1949 and pp. 121–124 in November 1949.

UNITED STATES PATENT OFFICE

CERTIFICATE OF CORRECTION

Patent No. 2,936,120 May 10, 1960

Samuel D. Bedrosian et al.

It is hereby certified that error appears in the printed specification of the above numbered patent requiring correction and that the said Letters Patent should read as corrected below.

Column 3, formula (4), in the denominator of the fraction, for "(4)" read -- 2 --; line 64, for "L" read -- 0 --; column 7, line 51, after "wiper" insert -- arm --.

Signed and sealed this 22nd day of November 1960.

(SEAL)
Attest:

KARL H. AXLINE
Attesting Officer

ROBERT C. WATSON
Commissioner of Patents